United States Patent
Krishnan et al.

(10) Patent No.: US 10,989,179 B1
(45) Date of Patent: Apr. 27, 2021

(54) METAL PLASMA THRUSTER CUBE

(71) Applicant: Mahadevan Krishnan, San Leandro, CA (US)

(72) Inventors: Mahadevan Krishnan, Oakland, CA (US); Katherine M. Velas, Oakland, CA (US)

(73) Assignee: Mahadevan Krishnan, Oakland, CA (US)

( * ) Notice: Subject to any disclaimer, the term of this patent is extended or adjusted under 35 U.S.C. 154(b) by 463 days.

(21) Appl. No.: 15/987,885

(22) Filed: May 23, 2018

(51) Int. Cl.
| | |
|---|---|
| *F03H 1/00* | (2006.01) |
| *H05H 1/48* | (2006.01) |
| *B64G 1/10* | (2006.01) |
| *B64G 1/40* | (2006.01) |

(52) U.S. Cl.
CPC .............. *F03H 1/0087* (2013.01); *B64G 1/10* (2013.01); *B64G 1/405* (2013.01); *H05H 1/48* (2013.01); *H05H 2001/481* (2013.01)

(58) Field of Classification Search
CPC .... F03H 1/0081; F03H 1/0087; F03H 1/0018; F03H 1/00; F03H 1/0006; B64G 1/406
See application file for complete search history.

(56) References Cited

U.S. PATENT DOCUMENTS

| | | | | |
|---|---|---|---|---|
| 4,785,220 A | * | 11/1988 | Brown | H01J 27/08 313/147 |
| 6,465,780 B1 | * | 10/2002 | Anders | G21K 1/093 250/298 |
| 2018/0244406 A1 | * | 8/2018 | Neumann | B64G 1/405 |

OTHER PUBLICATIONS

Brown "Vacuum Arc Ion Sources: A review" (Year: 2012).*
Brown "The Metal Vapor Vacuum Arc (MEEVA) High Current Ion Source" (Year: 1985).*
Qi "A Vacuum Arc Ion Thruster for Space Propulsion" (Year: 1998).*
Kolbeck "Micro-propulsion Based on Vacuum Arcs: A Review of Physics and Technology" (Year: 2016).*

* cited by examiner

*Primary Examiner* — Gerald L Sung
*Assistant Examiner* — William L Breazeal
(74) *Attorney, Agent, or Firm* — File-EE-Patents.com; Jay A. Chesavage

(57) ABSTRACT

A pulsed metal plasma thruster (MPT) cube has a plurality of thrusters, each having a first cathode electrode and a trigger electrode separated from the first electrode by an insulator sufficient to support an initiation plasma, and a porous anode electrode positioned a separation distance from the face of all of the cathode electrodes. The cathode electrode can be either the inner electrode or the outer electrode. A power supply delivers a high voltage pulse to the trigger electrode with respect to the cathode electrode sufficient to initiate a plasma on the surface of the insulator. The plasma transfers between the anode electrode and cathode electrode of selected thrusters, thereby generating a pulse of thrust.

21 Claims, 8 Drawing Sheets

Metal Plasma Thruster w/Axial Trigger
Front View

Metal Plasma Thruster w/Circumferential Trigger
Front View

Metal Plasma Thruster during Trigger Cycle
Side Section View

Metal Plasma Thruster during Thrust Cycle
Side Section View

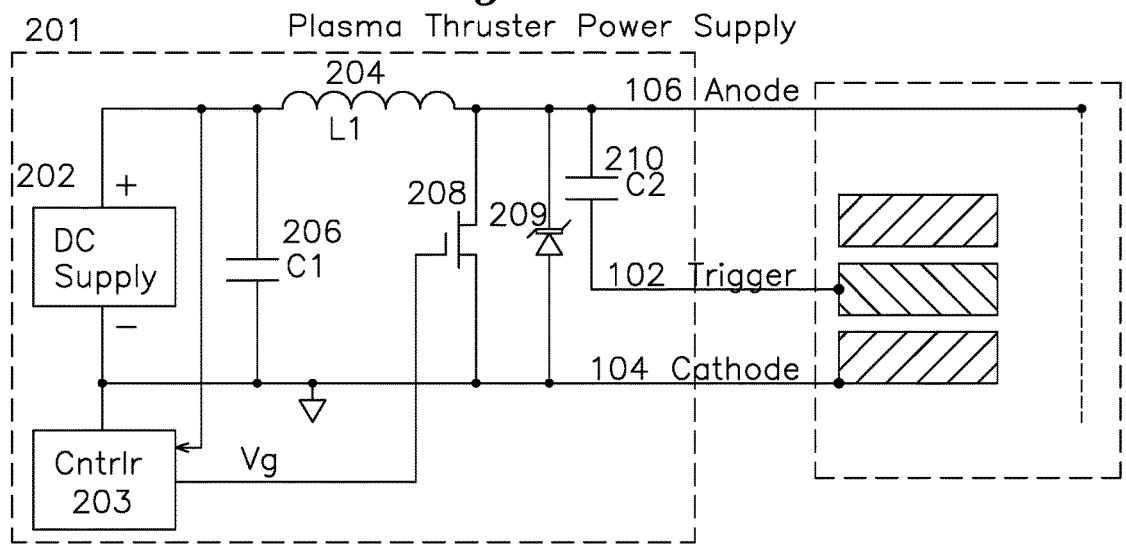
Figure 2
Plasma Thruster Power Supply
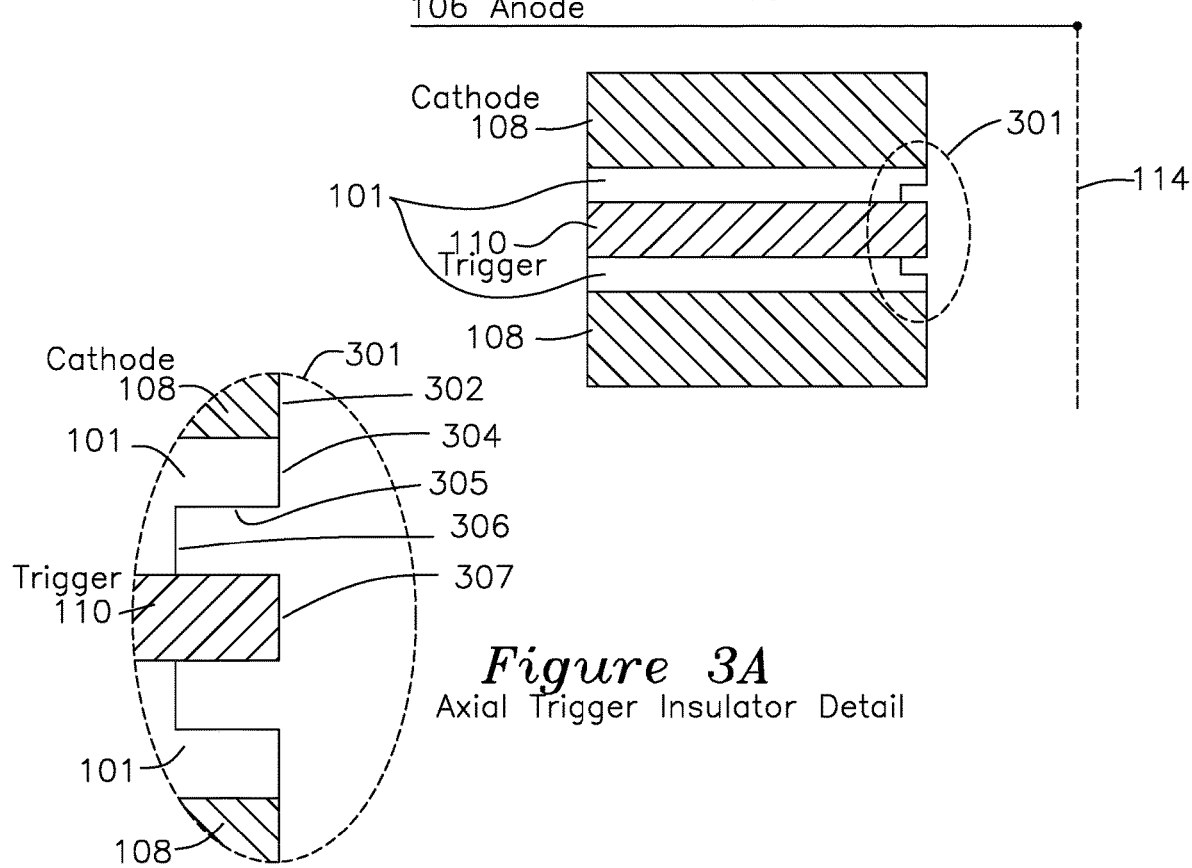
Figure 3
Axial Trigger Insulator
Figure 3A
Axial Trigger Insulator Detail Axial Trigger Insulator Configurations Axial Trigger Insulator Configuration Axial Trigger Insulator Configuration Axial Trigger Insulator Configurations Axial Trigger Insulator Configurations Axial Trigger Insulator Configurations Axial Trigger Insulator Configurations MPT Thruster with Circumferential Trigger Circumferential Trigger Detail Circumferential Trigger Detail Anode Current though Trigger and Thrust cycles L1 Inductor Current Waveforms Trigger Waveforms Non-trigger Waveforms

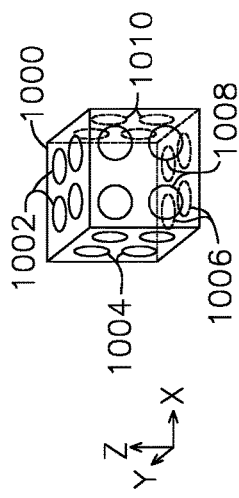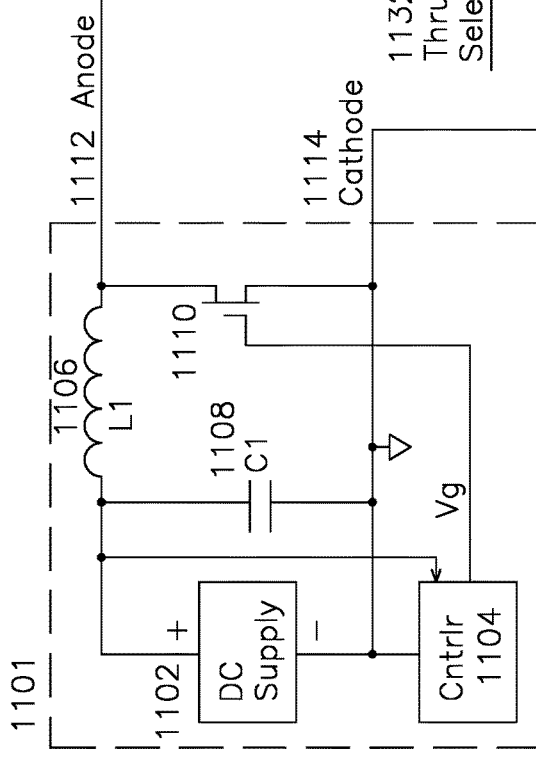

METAL PLASMA THRUSTER CUBE

FIELD OF THE INVENTION

The present invention relates to a plasma thruster for use in a satellite. In particular, the invention relates to a metal plasma thruster (MPT) which develops pulsatile thrust through a series of plasma generation cycles.

BACKGROUND OF THE INVENTION

The next decade will see a dramatic increase in the number of small satellites launched into Low Earth Orbit (LEO). These satellites range in mass from <1 kg pico- and femto-satellites up to nano-satellites (1 kg to 10 kg) and micro-satellites (10 kg to 100 kg). The small mass of pico- and femto-satellites makes it difficult to provide useful in-space propulsion, as the mass of fuel needed for even small maneuvers would exceed the satellite mass. Larger satellites such as small satellites (100 kg to 500 kg) and still larger satellites have available a wide range of well tested, in-space propulsion systems such as chemical rockets (hydrazine fueled, manufactured by Busek), electrothermal arcjets (manufactured by Aerojet) or electric propulsion thrusters such as Hall thrusters and Ion engines (manufactured by Busek).

As many as several thousands of the nano- and micro-satellites are expected to populate LEO, serving functions from imaging of the earth for crop and disaster management to provision of internet services. These satellites require onboard propulsion for station keeping, attitude adjustment or orbital maneuvers. Electric propulsion is more fuel efficient than chemical propulsion, but new forms of electric propulsion are required to meet the low-mass and size constraints imposed by these satellites. Scaling existing electric propulsion engines such as Xe ion engines and Hall thrusters down to 1 W to 10 W power levels is not practical. The unavoidable overhead mass of propellant storage tank, flow controls and plumbing in Xe ion engines and the increasing magnetic field with decreasing size in Hall thrusters makes their overall efficiency unacceptably low at these power levels.

One type of prior art plasma thruster is known as a PTFE Pulsed Plasma Thruster (PPT), which uses PTFE propellants in a configuration where the PTFE is positioned between two electrodes, a plasma is generated across the electrodes, and the PTFE is consumed in a series of high velocity plasma ejections which generate the desired thrust. A drawback to PTFE is that because the plasma is developed across electrically insulating PTFE, a large initiation voltage needs to be developed, and accordingly, the typical energy storage device is a high voltage capacitor that is charged to about 2 kV for each discharge cycle. In addition, the prior art PPT also requires a spark plug trigger to initiate the discharge. This spark plug trigger is charged to an even higher voltage, typically 5 kV to 10 kV, since the plasma is initiated over insulating PTFE propellant. The PPT thus uses high voltage components that require larger insulation gaps in the thruster assembly than would be required in an alternative lower voltage thruster which forms a plasma over a previously metallized film surface. The plasma from the PPT that provides thrust is composed of ions of carbon and fluorine. As such, the exhaust speed of this carbon/fluorine plasma is in the range of 5 km/s to 6 km/s, a comparatively low exhaust speed in contrast to other alternative thruster types which may range from 8 km/s to 20 km/s. The amount of propellant required to accomplish a mission in space depends exponentially on the exhaust speed. Hence the comparatively low exhaust speed of the prior art PPT makes it a less desirable option.

Another type of thruster is a Vacuum Arc Thruster (VAT), which utilizes two electrodes in combination with an insulator coated with a very thin layer of deposition metal. The prior art VAT relies on energy stored in an inductor to produce the discharge plasma across the insulator, which results in the vaporization of metal and associated thrust. In the prior art VAT, an inductor is first charged through a switch to a first current threshold, which triggers the opening of the switch. When the switch is opened, the inductive energy is released, and an inductive voltage peak LdI/dt is produced, which initiates a plasma arc by first forming microplasmas across the microgaps formed by breaks in a thin conductive surface applied to the surface of an insulating separator positioned between the anode electrode and the cathode electrode. The plurality of initial microplasma sites assists in the initiation of the main plasma discharge. These micro-plasmas expand into the surrounding space and allow current to flow directly from the cathode to the anode along a lower resistance plasma discharge path (10's of mΩ) than the initial thin film surface discharge path. The current that was flowing in the solid-state switch (for ~100 μs to 500 μs) before it was actively opened is fully switched to the vacuum arc load. Typical currents of ~100 A (for ~100 μs to 500 μs) are conducted with voltages of ~25 V to 30 V. Consequently, most of the magnetic energy stored in the inductor is deposited into the plasma pulse. A shortcoming of the VAT is the energy that is dissipated by the storage inductor and $I^2R$ switch losses during the charging cycle. During this phase of developing energy stored in the inductor, the current flows through the inductor and the switch, but not in the arc discharge, as the voltage necessary to trigger the arc is generated only after the switch is opened. The inductor and the switch are both dissipative elements, so a portion of the energy in each cycle is dissipated as heat in these elements. Another shortcoming of the VAT is re-deposition of ejected metal from the cathode onto the insulating layer. One prior art VAT geometry relies on the placement of the anode and cathode together as parallel electrode plates, with the electrode plates extending beyond the insulator in non-thrust directions to prevent plasma formation in those areas. However, devices of this construction have a shorter than desirable cycle lifetime before re-deposition of a film in excess of what the inductor can vaporize at arc initiation. This ultimately limits the number of cycles of thrust the device can provide. Additionally, the consumption of the cathode electrode creates an asymmetry which shortens the number of usable discharges. Another prior art VAT geometry has a series of ring electrodes acting as anode/cathode pairs. This configuration requires redirecting the ions which are ejected perpendicular to the desired thrust direction, using the energy storage inductor as a combined energy storage and particle redirection structure, with the discharged ions guided by the axial magnetic field of the storage inductor and an external cathode, as described in U.S. Pat. No. 7,518,085 by the present applicant.

From a different field of prior art plasma thrusters is a Field Emission Electric Propulsion (FEEP) device, which emits ions in continuous streams from needle electrodes. The ions in a FEEP are supplied from a non-toxic liquid salt that is stored in passive tanks. This liquid is wicked along the electrode tips by capillary action. The salt may consist of both positive and negative ions with masses ranging from a few hundred to several hundred Daltons. By periodically varying the polarity of the extraction potentials, positive and negative ions are extracted, thereby forming a charge neutral ion beam that exits the thruster. If only positive ions are extracted from the ion containing salt, a separate electron gun is required to neutralize the beam as otherwise expulsion of ions would charge the spacecraft up to a negative potential that in turn draws the ions back to the spacecraft, resulting in no thrust. The classical Focused Ion Beam (FIB) sources on which these FEEP thrusters are based use kV potentials across gaps of ~1 mm. In the case of the FEEP thrusters, the potential is lower (~1 kV) hence the gaps must be smaller (~100 μm). The tight gaps between electrodes and high electric fields in the device pose challenges for fabrication of millions of emitters that operate reliably in unison, which results in reliability and manufacturability problems.

It is desired to provide an improved plasma thruster operative with higher exhaust velocity ions than in the PPT, with improved reliability and lifetime over the prior art VAT, and with components that are simpler to fabricate and more reliable in operation than the FEEP thruster.

Objects of the Invention

A first object of the invention is a metal plasma thruster comprising:
a cathode electrode and a trigger electrode separated by an insulator;
the insulator having a first surface region substantially planar to the cathode electrode face and a proximal or adjacent second surface obscured from re-deposition of material ejected from the cathode electrode face;
a porous anode electrode positioned opposite the cathode electrode face.

A second object of the invention is a metal plasma thruster comprising:
a central cathode electrode having a face;
an annular insulator surrounding the central cathode electrode;
an outer trigger electrode surrounding the annular insulator and having a face which is substantially parallel to the central cathode electrode face, the outer trigger electrode, insulator surface, and cathode electrode providing a plasma formation surface;
the insulator having a first surface parallel to the central cathode electrode face, the insulator having a second surface which is proximal to the first surface and obscured from re-deposition of material ejected from the central cathode face;
a porous anode positioned opposite the cathode face.

A third object of the invention is a metal plasma thruster comprising:
a central trigger electrode having a face;
an insulator surrounding the central trigger electrode;
a cathode electrode surrounding the insulator;
the insulator having a first surface which is parallel to the cathode electrode face, the insulator having at least one second surface which is obscured from re-deposition of material ejected from the cathode electrode face;
a porous anode electrode positioned opposite the cathode electrode face.

A fourth object of the invention is a power supply for a metal plasma thruster (MPT) having an anode output, a reference output, and a trigger output, the power supply comprising:
a first capacitor coupled to a source of charge, the capacitor connected to the reference output and having a voltage terminal;
an inductor positioned between the anode output and capacitor voltage terminal;
a switch element positioned between the anode output and reference output;
a second capacitor placed between the anode output and the trigger output;
a controller which keeps the switch open during a charge interval until the first capacitor reaches a threshold voltage, or alternatively holds the first capacitor at a threshold voltage until a thrust event is required, the controller thereafter closing the switch for an interval sufficient for the inductor to develop the requisite current to subsequently form a trigger arc upon the switch opening, the trigger arc formed between a trigger electrode connected to the trigger output and a cathode connected to the reference output, the trigger arc thereafter causing a plasma formation between a cathode connected to the reference output and an anode connected to the anode output.

SUMMARY OF THE INVENTION

In one example of the invention, a metal plasma thruster (MPT) has a central trigger electrode surrounded by an insulating trigger plasma initiator, the insulating initiator surrounded by a cathode electrode. In one example configuration, the outer radius of the central trigger electrode is significantly less than the outer radius of the cathode electrode, and a porous anode electrode is positioned a separation distance from the face of the cathode.

In another example configuration, the outer radius of a central cathode electrode is significantly greater than an annular ring width of a trigger electrode which surrounds the central cathode electrode and is separated from it by an annular insulator surrounding the central cathode electrode, the annular insulator providing a surface for initial plasma formation between the trigger electrode and the central cathode electrode, after which the plasma forming at the cathode transfers from the trigger electrode to a porous anode electrode positioned a separation distance from the face of the cathode electrode. The insulator separating the coaxial trigger electrode from the cathode electrode includes a surface geometry that shields ejected metal ions from the cathode from depositing on the insulating separator.

Compared to the prior art PTFE PPT which requires a high voltage trigger and ejects low velocity propellant, or the VAT which requires a storage inductor which includes a charging cycle during which time approximately 25% to 50% of the stored energy is lost, the inventors have found the metal plasma of the present invention to be far more energy efficient. The MPT charges the inductor for a very short time (<100 μs) when compared to the arc discharge time (~3 ms to 6 ms). This means that less than 5% of the stored charge in the MPT storage capacitor is discharged up to the point that the switch is opened, allowing >95% of the charge to flow in the arc discharge plasma, contributing to thrust. By contrast, the VAT requires the current prior to discharge to be at its maximum value before its switch is opened, which results in <50% of the stored charge flowing into the arc.

In another example of the invention, a power supply has a ground reference, a trigger output, and an anode output for connection to a cathode, trigger, and anode, respectively of a metal plasma thruster. The power supply has a controller which provides a variable storage capacitor charge time and a variable inductive switch time. The power supply and controller are operative to generate thrust events from the metal plasma thruster, the power supply having a first storage capacitor having one terminal connected to a charging source and the other terminal connected to the ground reference. An inductor is positioned between the first capacitor charging source terminal and the anode output. A second capacitor is coupled from the anode output to the trigger output of the power supply. The trigger electrode of the plasma thruster is in close proximity to the cathode electrode sufficient to initiate a plasma arc. The anode output and reference output are periodically connected together by a switch element which is actuated by the controller. The controller is operative to keep the switch element open until the first capacitor charges to a threshold voltage and/or a thrust cycle event is requested, thereafter closing the switch for an interval of time sufficient for the inductor to charge enough current through the inductor such that upon opening the switch, the LdI/dt voltage spike initiates an arc between the MPT trigger electrode and cathode electrode upon the opening of the switch. The switch remains open for the duration of a thrust cycle, during which time the plasma transfers from between the trigger electrode and cathode electrode to between the cathode electrode and anode electrode, thereby generating thrust through the thrust cycle until the current is insufficient to maintain the plasma, at which time the first capacitor charge, switch closure, switch opening, and thrust cycle repeats. Each cycle results in the generation of a pulsatile thrust event.

BRIEF DESCRIPTION OF THE DRAWINGS

FIG. 1A-1 shows a side section view of a metal plasma thruster during a trigger cycle.

FIG. 1A-2 shows a side section view of a metal plasma thruster during a thrust cycle.

FIG. 2 shows a power supply and controller for a plasma thruster.

FIG. 10 shows a perspective view of a three axis thrust cube.

FIG. 11 shows a schematic drawing of a thrust power supply coupled to a trigger driver for driving the three axis thrust cube of FIG. 10.

DETAILED DESCRIPTION OF THE INVENTION

Figure 1A:
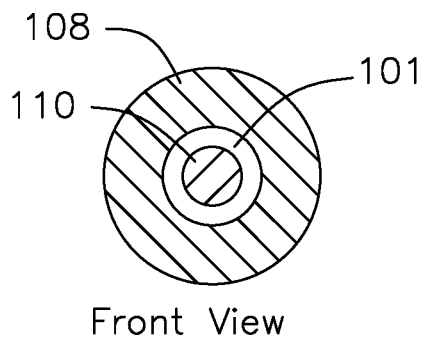
FIG. 1A shows a front view for a metal plasma thruster with an axial trigger electrode.
Figure 1B:
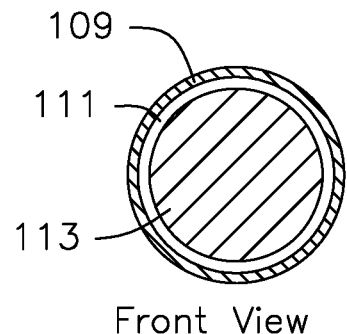
FIG. 1B shows a front view for a metal plasma thruster with a circumferential trigger electrode.

FIG. 1A shows a front view of a first configuration for a metal plasma thruster (MPT) where a central trigger electrode 110 is separated from a cathode face 108 by an annular insulator 101 over which an initiation plasma is formed. The insulator may be formed from glass, Alumina (aluminum oxide), or any ceramic with a high melting point. FIG. 1B shows an alternative circumferential trigger configuration where a central cathode face 113 is separated by an outer circumferential trigger electrode 109 with insulator 111 positioned inside the radial extent of the trigger electrode 109. Axial trigger configuration FIG. 1A is a front view best understood in combination with side section view FIG. 3, and circumferential trigger configuration FIG. 1B is best understood in combination with side section view FIG. 4.

The cathode 108 of FIG. 1A or 113 of FIG. 1B may be formed of any material, preferably a metal which provides a comparatively high erosion rate during operation, indicating a comparatively high mass flow rate, in combination with a high exhaust speed. Suitable materials include any of the elements: Lithium (Li), Carbon (C), Magnesium (Mg), Aluminum (Al), Titanium (Ti), Chromium (Cr), Niobium (Nb), Molybdenum (Mo), Tantalum (Ta), Tungsten (W), Platinum (Pt), or Uranium (U). The below table identifies each cathode element with atomic mass unit (AMU), maximum metallic ion velocity in m/s, and specific impulse $I_{SP}$ (change in momentum per unit of propellant consumed).

TABLE 1

| 1<br>Metal | 2<br>AMU | 3<br>speed, m/s | 4<br>ISP (s) |
|---|---|---|---|
| C | 12 | 17403 | 1774 |
| Mg | 24.31 | 19637 | 2002 |
| Al | 26.98 | 23500* | 2396 |
| Ti | 47.87 | 15354 | 1565 |
| Cr | 52.00 | 16161 | 1647 |
| Nb | 92.91 | 16855 | 1718 |
| Mo | 95.94 | 17235 | 1757 |
| Ta | 180.95 | 11990 | 1222 |
| W | 183.84 | 11033 | 1125 |
| Pt | 195.08 | 8105 | 826 |
| U | 238.03 | 11339 | 1156 |

The propellants listed in Table 1 are not exclusive, as any conducting solid element or alloy may be used as an electrode material in the MPT, ranging from Lithium at the low mass end to depleted Uranium or higher at the upper mass end. A comprehensive list of suitable cathode metals for the present invention, sorted by melting point, includes: Magnesium, Aluminum, Radium, Barium, Strontium, Cerium, Europium, Ytterbium, Calcium, Lanthanum, Praseodymium, Silver, Neodymium, Actinium, Gold, Samarium, Copper, Promethium, Uranium, Manganese, Beryllium, Gadolinium, Terbium, Dysprosium, Nickel, Holmium, Cobalt, Erbium, Yttrium, Iron, Scandium, Thulium, Palladium, Protactinium, Lutetium, Titanium, Thorium, Platinum, Zirconium, Chromium, Vanadium, Rhodium, Hafnium, Technetium, Ruthenium, Iridium, Niobium, Molybdenum, Tantalum, Osmium, Rhenium, Tungsten, and Carbon. These metals may be referred to as "tier 1" metals, which may be present in the cathode in elemental form, or as alloys of other metals.

Alternative metals with a lower melting point which could be used as a cathode in the present MPT include: Francium, Cesium, Gallium, Rubidium, Potassium, Sodium, Indium, Lithium, Tin, Polonium, Bismuth, Thallium, Cadmium, Lead, and Zinc. These materials may be referred to as "tier 2" metals, which may be present in elemental form, or as alloys of other metals. In the scope of the present invention, the above "tier 1" and "tier 2" metals listed above are understood to suitable for use as cathode material for the MPT individually, or alloyed with other metals, for use in forming the MPT cathode in the present invention. Although the metals are sorted by melting point, this is not intended to imply a preferred order for use in the cathode of the MPT.

The MPT offers a broad range of ISP from 800 s to 2400 s, whereas PTFE (Teflon®) of the prior art PPT is limited to a narrower range of values of roughly 525 s to 600 s.

The anode 114 is a conductive electrode positioned a separation distance from the cathode (108 or 113) face, and the anode 114 has greater than 80% porosity to allow passage of accelerated metal ions. The anode 114 may have any shape including a screen or an annular ring or a torus with a diameter which is equal to or greater than the diameter of the cathode 108 of FIG. 1A or trigger electrode 109 of FIG. 1B. The anode may be formed from any conductive material, refractory metal, or a stainless steel alloy such as an alloy containing at least steel and chromium, and with the largest practical porosity, so that the metal ions are accelerated from the cathode, but propagate through the porous anode.

Figures 1, 1A:
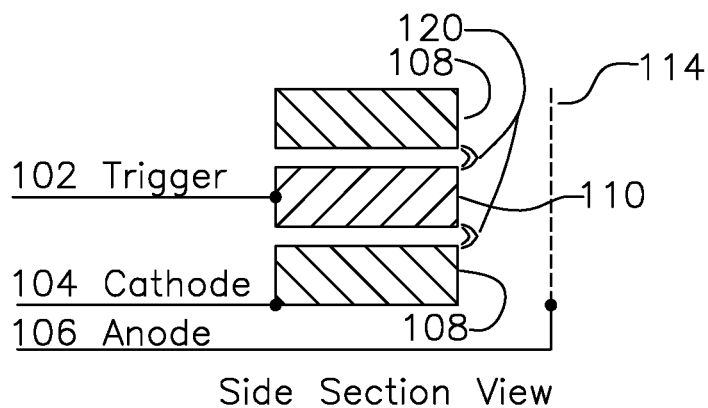

FIG. 1A-1 shows a section view of an MPT where the trigger electrode 110 generates a pulsatile voltage which is applied between the trigger electrode 110 and cathode 108 and which exceeds a breakdown voltage across the insulator 101. In the MPT of FIG. 1A-1, the high voltage pulse is applied between the trigger lead 102 and the grounded cathode lead 104 using the power supply 201 of FIG. 2.

Figures 1, 1A, 2:
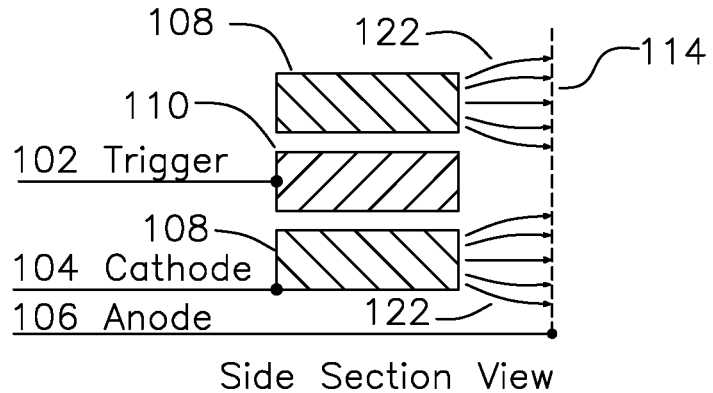

FIG. 2 shows a power supply 201 for use with any of the plasma thruster configurations previously described. A power supply 202 charges an energy storage capacitor C1 206. A controller 203 determines the rate of charge, how often to discharge thrust, when to close switch 208, and for how long to close switch 208 according to requested thrust, material consumption, trigger requirements, and other input parameters. Switch 208 is normally off, and may be an insulated gate bipolar transistor (IGBT), a field effect transistor (FET), bipolar transistor, or any other controllable switch element capable of withstanding high voltages (in excess of 1 kV) and 100 A currents, the switch 208 having low switch on resistance (<30 mΩ), and a fast (<500 ns) switching time. During the time the switch 208 is off, trigger 102 and grounded cathode 104 are equipotential to each other. When the voltage across C1 206 reaches a threshold voltage determined by controller 203, and when the controller 203 has a request for a thrust event, a trigger voltage Vg is delivered as a short pulse of duration T1 (of FIG. 5) to switch 208, which closes and causes a current to flow through L1 for a duration of time T1 sufficient to generate an initiation plasma when switch 208 is opened at the end of T1, which causes a positive voltage spike to be developed at switch 208, which is coupled through trigger capacitor C2 210 to trigger lead 102. The resulting trigger plasma formed between the trigger electrode 110/109 of FIGS. 1A and 1B and cathode electrode 108/113 of FIGS. 1A and 1B is the result of current flowing through the circuit formed by C1, L1, C2, trigger lead 102 and cathode lead 104. The interval T1 for which the gate Vg enables the switch 208 is selected to be sufficient only for plasma initiation, after which the plasma thrust interval T2 (of FIG. 5) begins, during which time the main plasma from cathode 108/113 (associated with cathode lead 104) to anode 114 (associated with anode lead 106) develops, through the circuit C1 206, L1 204, anode lead 106 and cathode lead 104. To minimize trigger energy losses, inductor L1 204 and the interval T1 are selected to be the smallest possible values sufficient to generate a sufficiently high voltage (LdI/dt) to trigger micro-discharge plasmas across the face of the metallized insulator (region 301 of FIG. 3 or region 401 of FIG. 4 with surface profile 402 and central axis 403) and thereby to facilitate arc breakdown between the cathode 104 and anode 106.

The first capacitor C1 206 is charged (generally up to 100 V or other suitable voltage) by a DC current directly from power supply 202, such as from a spacecraft solar source, or with a charge rate regulated by controller 203. Initially both the switch (IGBT or MOSFET 208) and the trigger plasma path from trigger electrode 110 to cathode 108 across insulator 101 (of FIG. 1), or trigger electrode 109 to cathode 113 across insulator 111 are open and the vacuum gap between the cathode (108 or 113, respectively) and anode 114 also ensures that no current flows back to the power supply ground across that gap. When C1 206 is fully charged, a trigger signal Vg is sent by controller 203 to the control input of the switch to close the switch 208 and current flows from C1 206 through the coil L1 204, the switch 208 and returns to the capacitor ground, building increasing current in L1 204 until such current allows generation of a sufficiently high LdI/dt voltage when the switch T1 208 is opened, to generate a trigger electrode arc. In one example, after 30 μs to 100 μs, the switch 208 is opened by control input Vg returning to 0 V, and the voltage (LdI/dt) developed by L1 204 is delivered through C2 210 to the trigger electrode to initiate the plasma between the trigger electrode and cathode electrode across the insulator gap.

Inductor 204 has an inductance value which is just high enough to generate an adequate breakdown voltage (such as in the range 200 V to 2000 V) across the insulator gap between cathode 108/113 and trigger electrode 110/109. Hence this inductor 204 may be small and low mass, as opposed to the inductor in the prior art VAT which must be of high enough value to store the required arc energy applied between anode and cathode of that configuration. In the MPT, the inductor is not the primary energy source for the arc and serves only to provide the LdI/dt voltage spike necessary to trigger the arc. The charge and energy to the arc are provided mainly by the storage capacitor C1.

Figure 4:
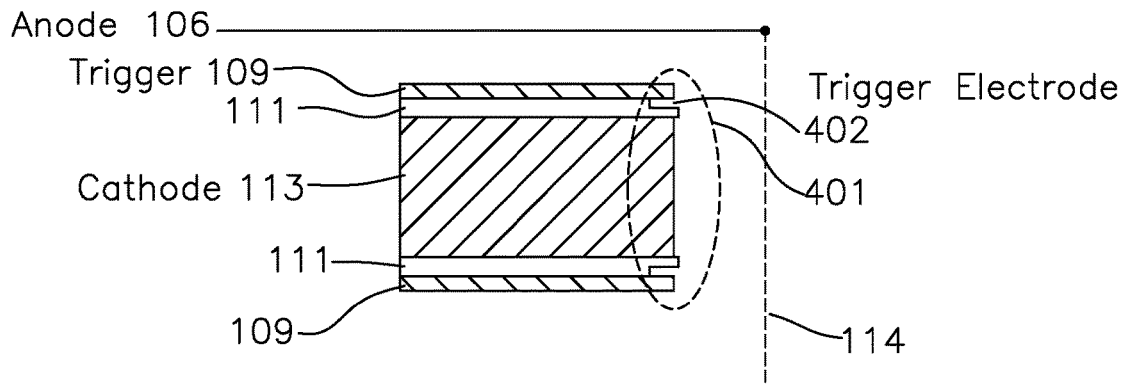
FIG. 4 shows a section view of an insulator for a circumferential trigger thruster.
Figure 5:
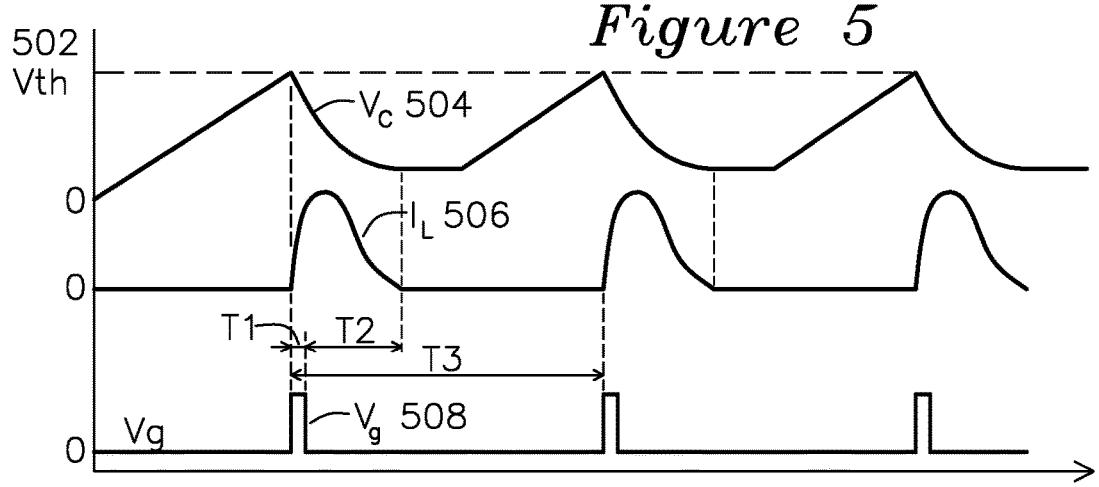
FIG. 5 shows overview waveform plots for the operation of the plasma thruster.

FIG. 5 shows waveforms of operation for the Metal Plasma Thruster. An energy storage capacitor (C1 206 of FIG. 2) is charged by an external power source developing a voltage Vc 504. When the capacitor voltage reaches a threshold voltage 502 and upon command from the controller 203 of FIG. 2, the switch 208 is triggered by Vg 508 during T1, which causes the switch 208 to close. The trigger T1 interval removes a small amount of charge from the capacitor, which is used to initiate a trigger plasma such as 120 shown in FIG. 1A-1, or analogously across the insulator of region 301 of FIG. 3 or the insulator of region 401 of FIG. 4. Subsequent to the trigger T1 interval is the plasma thrust interval T2 of FIG. 5, where the plasma spreads between the cathode face and the anode 114 of FIG. 3 or 4, shown as 122 of FIG. 1A-2. During T2, the stored charge in the capacitor is depleted by plasma generation until the capacitor voltage or arc current drops below a voltage level which no longer supports the plasma. The cycle repeats at the next trigger Vg event, and the repetition period T3 is limited by the current provided to the capacitor by the external charging circuit.

Figure 6:
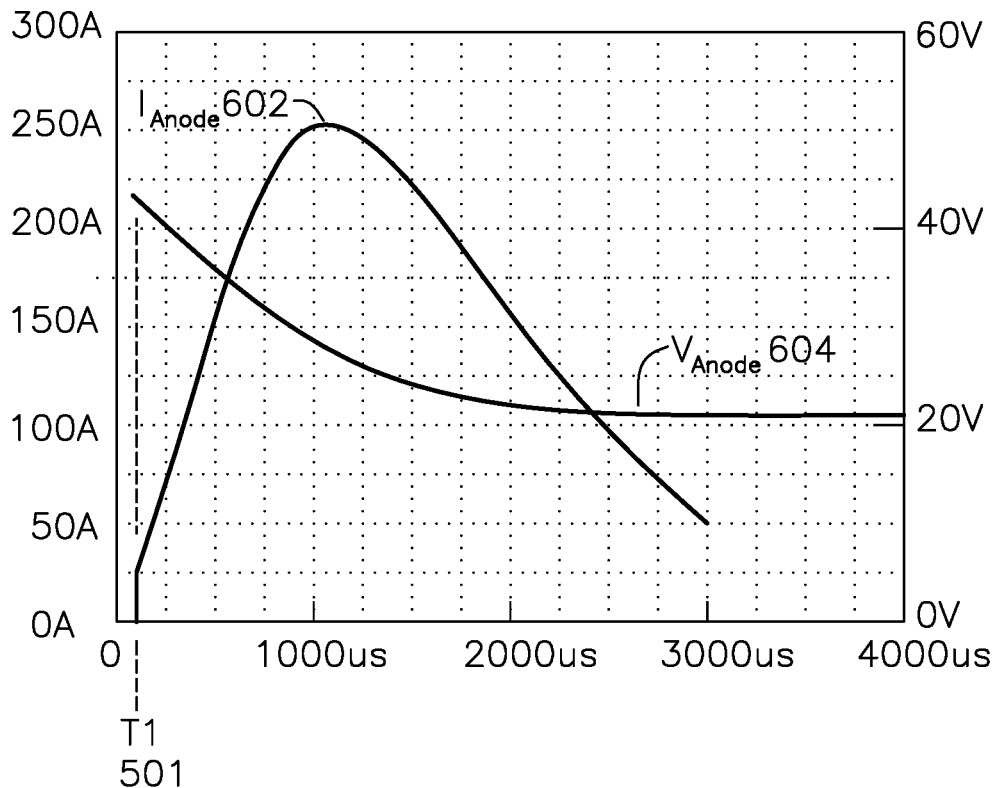
FIG. 6 shows a plot for anode current and anode voltage over a thrust cycle.

FIG. 6 shows the current and voltage during the main cathode to anode arc period lasting an example thrust interval of 3 ms, corresponding to interval T2 of FIG. 5. Waveform 602 shows example anode electrode current, and waveform 604 shows example anode electrode voltage with respect to the grounded cathode, for an example fixed arc resistance of 70 mΩ and an arc sheath potential drop of 19 V. One component of applied voltage developing a plasma is the sheath potential plus an Ohmic voltage drop across the arc. The sheath potential is a well-known phenomenon in arc discharges, where ions from the main discharge plasma in the anode-cathode gap return across a cathode sheath, gaining energy, ~10 eV to 15 eV for each singly charged ion, and heat the cathode locally in several spots to support field enhanced thermionic emission of the electrons needed to carry the arc current from cathode to anode. Those current carrying electrons cross another thin sheath at the anode, gaining energy (~10 eV) and deposit that energy as heat into the anode. The sum of the cathode and anode sheath potentials is 19 V in this example. At the peak current of 230 A, the Ohmic drop is 230 A*70 mΩ=16 V. With the 19 V sheath drop added, the total voltage of the arc (between cathode and anode) at peak current is 35 V. This terminal voltage between cathode and anode is called the burning voltage of the arc.

Figure 7:
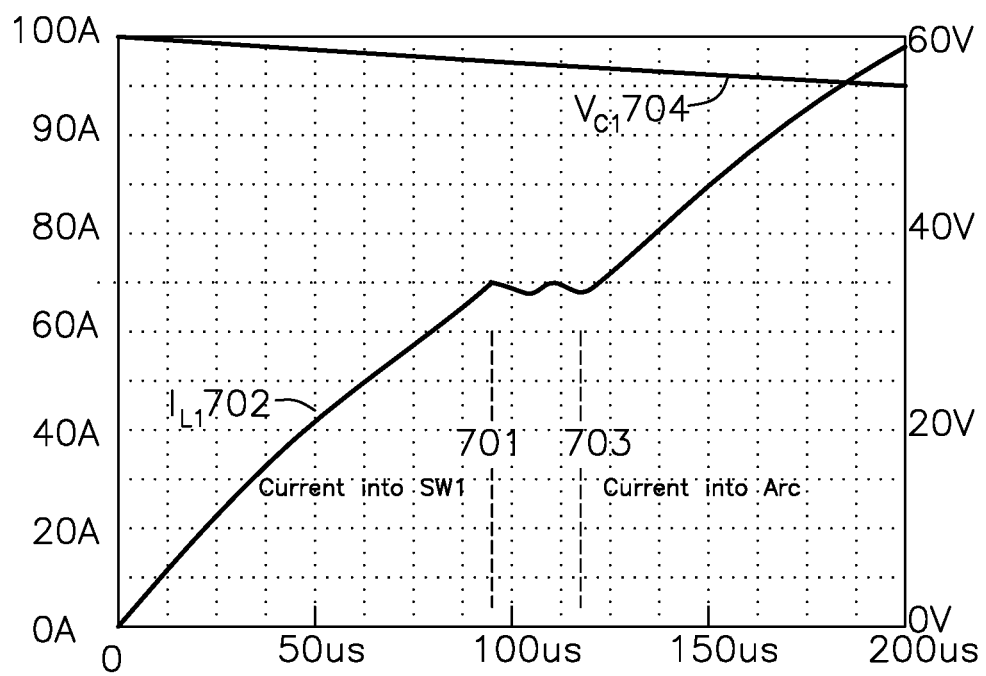
FIG. 7 shows a plot for operation of the plasma thruster from a trigger cycle to a thrust cycle.

FIG. 7 shows the waveforms for an interval of time from 701 to 703 corresponding to the switch transitioning from T1 (Vg on) to T2 (Vg off), where the plot 704 shows capacitor C1 charged, and the switch 208 closed until time 701, during which first interval the current through C1 206, L1 204, and switch 208 ramps as $I_{L1}$ 702 until time 701 when the switch opens and the trigger plasma initiates. During the interval from 701 to 703, the current path transitions to C1, L1, C210 and trigger electrode 102, followed by the current flowing through anode 106 to cathode 104. At time 703, the plasma has spread from cathode 108/113 to anode 114, and the current continues to ramp from time 703 onwards as the plasma grows between the cathode and anode (electrode), resulting in an effectively decreasing resistance across the plasma until the stored energy in capacitor 206 no longer supports a plasma. Plot $I_{L1}$ 702 shows a linear ramp up to about 70 A at time 701 during the first 90 μs of an example T1 when the switch is closed, followed by a slight dip and a sinusoidal increase thereafter. Anode current plot 702 is for the example of FIG. 2, with example component values C1=10.5 mF, L1=70 μH and a total loop resistance (of the capacitor, coil and switch in its closed state) of 40 mΩ.

Figure 8:
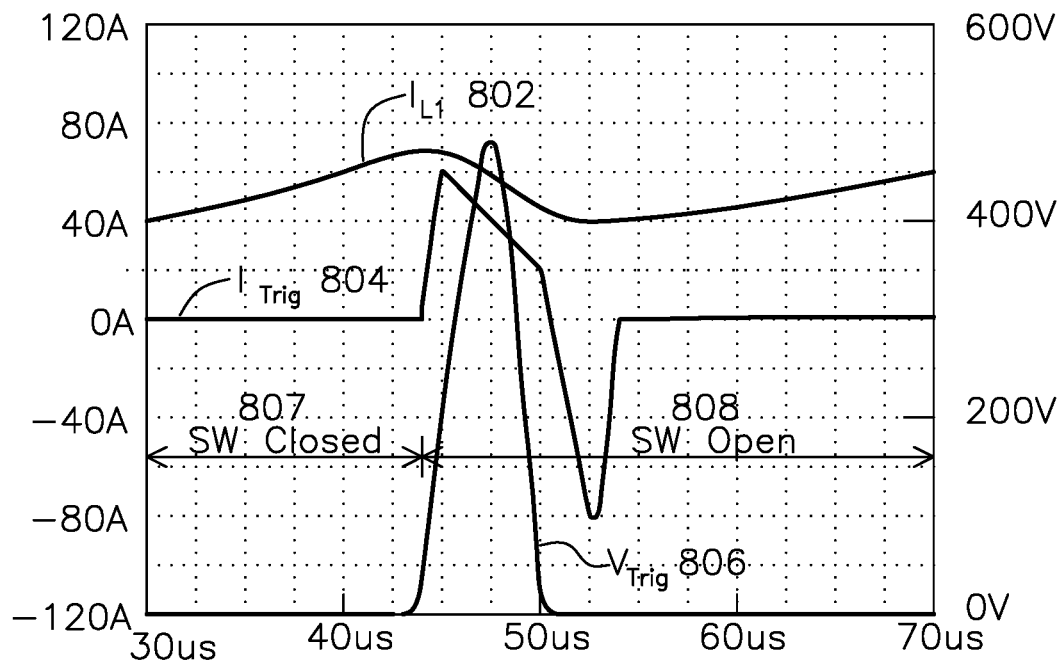
FIG. 8 shows a plot for trigger cycle waveforms.

FIG. 8 shows the waveforms for a segment in time which includes the trigger interval, shown starting at ~45 μs when the switch 208 opens at the end of T1 interval 807. As the switch opens, its internal resistance rapidly increases, causing the current in the switch 208 to decay rapidly. The interruption of current through switch 208 causes the voltage applied to the trigger electrode Vtrig 806 to rapidly increase, causing a plasma to develop at the trigger electrode. At that moment, trigger electrode current 804 begins to flow and generates more trigger plasma. As the trigger plasma fills the gap between the cathode and anode the plasma current path transitions from between cathode and trigger to between cathode and anode, and the trigger capacitor now drives current in the opposite direction and the trigger current 804 reverses polarity. The inductor current $I_{L1}$ 802 changes slope during the trigger plasma interval from 45 μs to 55 μs as the current starts to decay due to the rapidly increasing resistance in switch 208. The change in current contributes to the LdI/dt voltage and as that voltage increases, current flowing through the switch 208 is diverted to the trigger electrode 102 for forming the initial trigger arc to the cathode. When the switch is opened (at ~43 μs in the instant FIG. 8 example), the dip in current $I_L$ 802 in coil L1 generates a voltage LdI/dt $V_{TRIG}$ 806 at the coil output node. The initial fast (~200 ns) voltage spike of 120 V passes through the blocking capacitor C2 210, which is selected to offer low impedance (<1Ω) to a fast (<1 μs) rise time pulse and creates a flashover plasma (120 of FIG. 1A-1) across the metallized (10Ω to 1 kΩ) insulator surface (region 301 of FIG. 2 or region 401 of FIG. 4) between the trigger electrode (110 of FIG. 3 or 109 of FIG. 4, respectively) and the cathode (108 of FIG. 3 or 113 of FIG. 4, respectively). An example trigger current from the trigger electrode to cathode electrode has a magnitude of 45 A (which implies a flashover resistance of approximately 2.7Ω) and creates sufficient plasma 120 of FIG. 1A-1 to bridge the main cathode to anode gap and initiate a breakdown 122 of FIG. 1A-2 across the main cathode to anode gap. The arc breakdown is across a plasma bridge whose resistance is <100 mΩ, allowing higher currents to flow from C1 through L1 and the arc discharge. The much higher resistance of the trigger path ensures that negligible current flows through the trigger electrode path, as shown by trigger current plot 804 which returns to zero at ~55 μs as the anode arc current increases. Furthermore, the blocking capacitor C2 offers increasingly higher impedance as the current increases, going from <1Ω for the 100 ns rise-time of the switch voltage up to >6000Ω during the slower period of the main arc. Hence the trigger path is active only for on the order of 10 μs after the switch 208 is opened. The trigger electronic current 804 goes negative at 50 μs of FIG. 8 when the main plasma arc from cathode to anode ignites, since the blocking capacitor C2 210 now drives current in the reverse direction through the arc. The switch 208 voltage drops to about 33 V after about 53 μs, which is the arc burning voltage (sheath drop+Ohmic drop across the arc resistance). In this example, the voltage reaches a peak of about 400 V before decaying back to the arc burning voltage of about 33 V.

Figure 9:
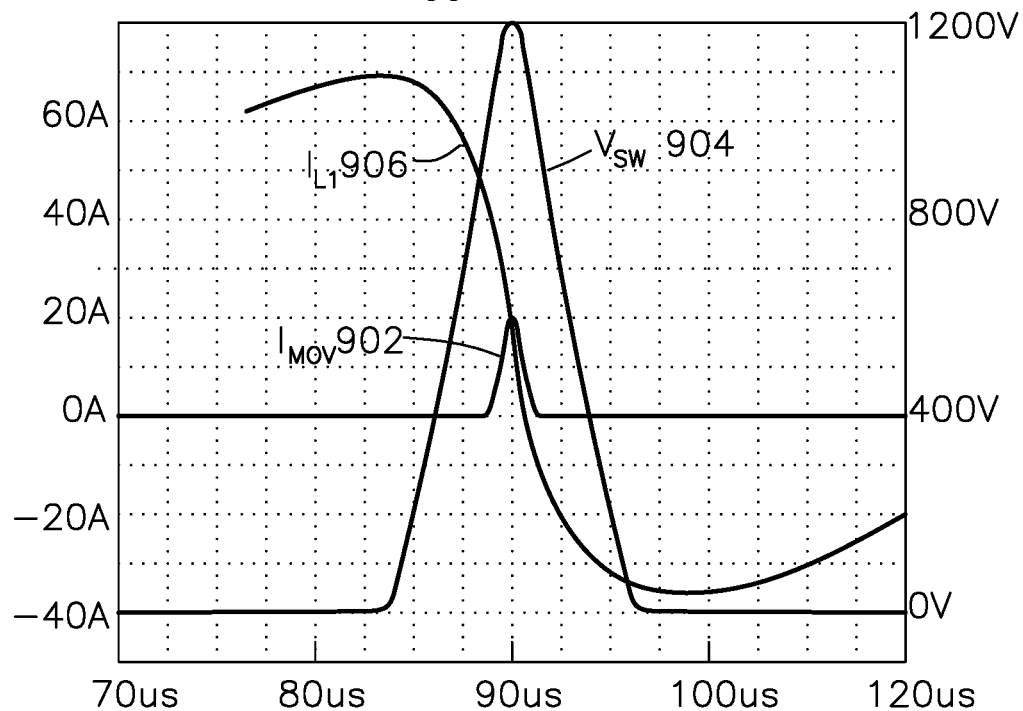
FIG. 9 shows a waveform plot for a missed trigger.

FIG. 9 shows the result when the trigger interval T1 is too short, or not enough voltage is developed at the trigger electrode to initiate a plasma. As the voltage developed by discontinuously interrupting the inductor current is LdI/dt, care must be taken not to exceed the breakdown voltage of switch 208. This protection is provided by overvoltage device 209, which may be any device which clamps a voltage which exceeds a threshold and has sufficiently fast response time to provide protection to the switch during transient voltage events. One such device is a metal oxide Varistor (MOV) 209. In the example waveforms of FIG. 9, switch voltage 904 reaching 1200 V with weak or delayed plasma formation results in the MOV 209 shunting some of the current as shown in waveform 902, thereby protecting the switch 208 from overvoltage breakdown. This protection device 209 clamp voltage is selected for prevention of overvoltage damage to switch 208. Inductor current 906 is also shown for reference.

The various charging times, plasma arc discharge times, cycle times, and circuitry are shown for example purposes only, and many other variations are possible. The plasma arc was described as being activated in discrete thrust events using discrete energy level stored in an inductor. Alternatively, a DC voltage source may be placed between anode electrode and cathode electrode, such that when the initiator electrode develops a plasma arc, the DC source maintains the plasma arc in steady state until the DC source is removed. In a discrete pulsed mode, the inductance of the inductance of the energy storage inductor and plasma electrode geometry and spacing governs the interval of time for which the arc is maintained, and the durations and waveforms given are illustrative in nature for the components used, and are not intended to limit the values of these components or waveform durations and times they produce.

Figure 3B:
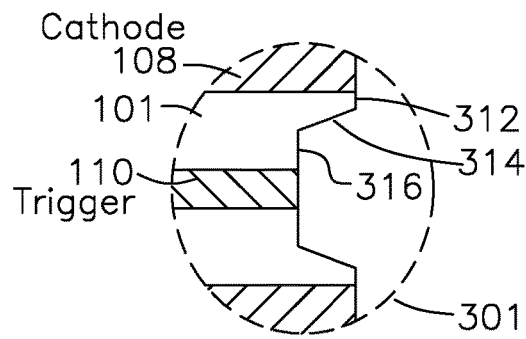
FIGS. 3A, 3B. 3C, 3C-1, 3D, 3E, 3F, and 3G show insulator configurations for the detail view of FIG. 3.
Figure 3C:
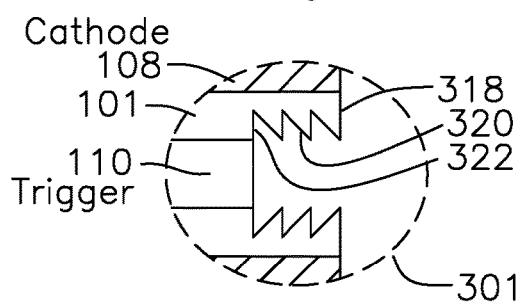
FIG. 3 shows a section view of an insulator for an axial trigger thruster.
Figures 1, 3C:
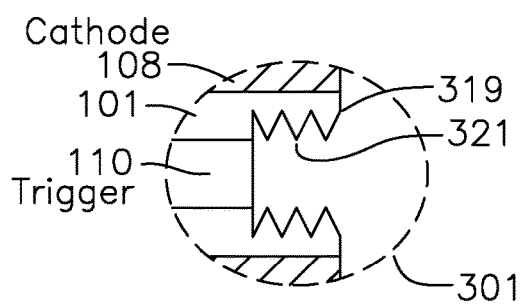
Figure 3D:
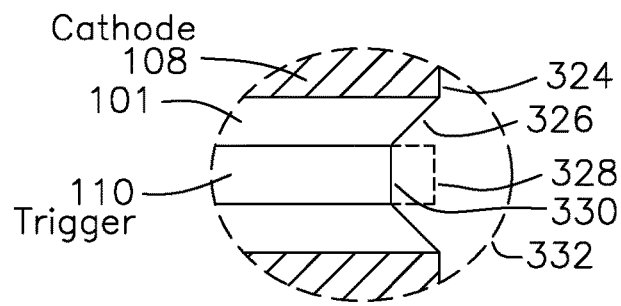
Figure 3E:
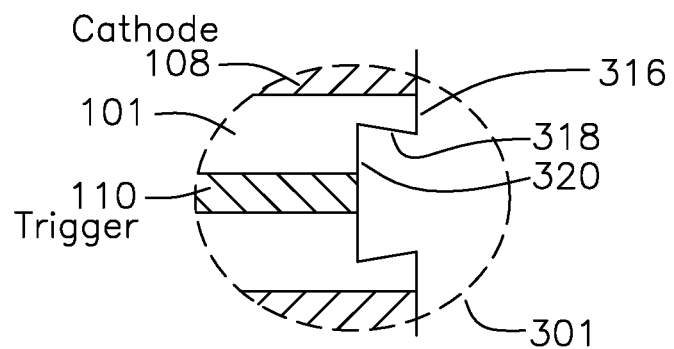
Figure 3F:
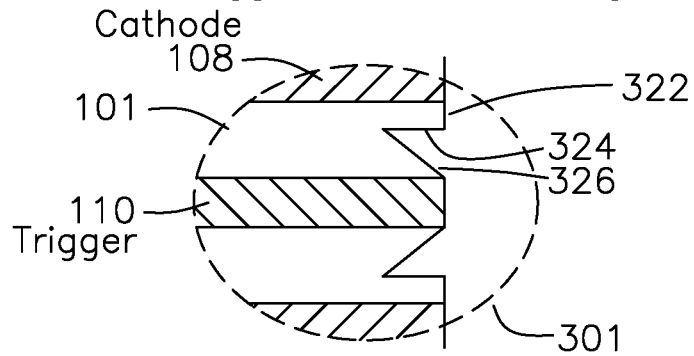
Figure 3G:
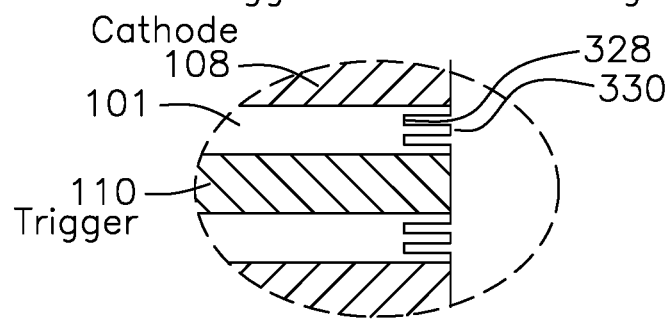
Figure 4A:
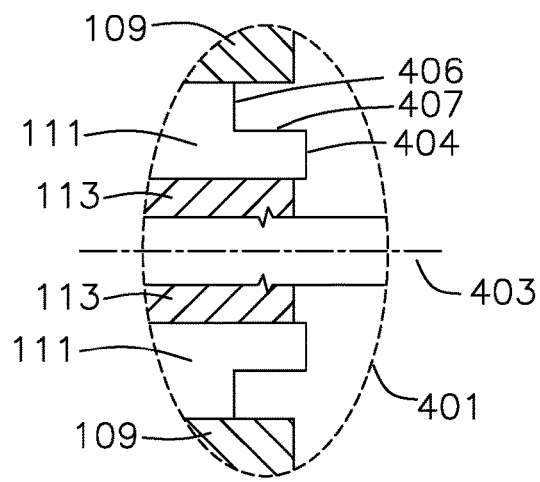
FIGS. 4A and 4B shows detail views of FIG. 4.
Figure 4B:
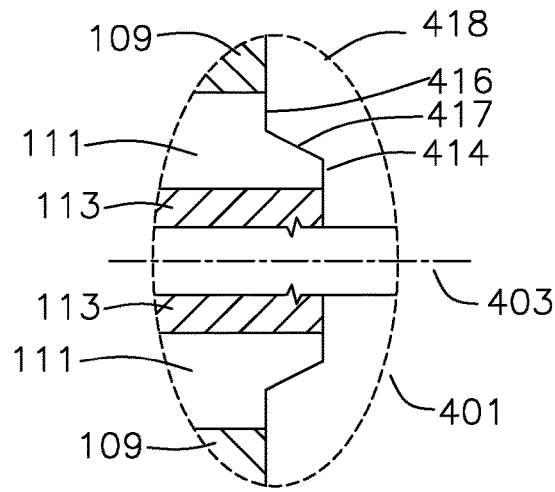

The shapes of insulator surfaces of region 301 of FIG. 3, shown in detail FIG. 3A, and region 401 of FIG. 4, shown in detail FIG. 4A, are critical for the long-term operation of the plasma thruster. As shown in FIG. 3A region 301, by stepping the insulator 101 to create a planar insulator surface 304 and proximal surfaces 305 and 306 below the cathode face 302, the surface resistance of the depressed segment of the insulator 306 may be kept nearly constant over many plasma cycles and extend the longevity of the thruster. One specific function of the shape of the insulator 101 geometry is to provide one or more surfaces of the insulator which are obscured from re-deposition of metal ejected from the cathode 108/113. Example proximal surfaces 305 or 306 of FIG. 3A may perform this function. The surface of the insulator 101 may rely on an initial metallization on the order of 1µ thickness with micro-gaps to form areas where micro-arcs may form in the small gaps of the surface metallization, which are critical to the initiation of the plasma arc. An insulator surface resistance in the range of tens of ohms to thousands of ohms is preferred, although other resistances may be used which form microplasmas in the gaps between surface metallization. Other insulator surface profiles are shown in the insulator detail FIGS. 3B, showing a ramp with obscured surface 314 adjacent to a deposition surface 312, FIG. 3C showing a sawtooth with obscured surface 320 and exposed surface 318, or alternative of FIG. 3C-1 which shows a sawtooth with peaks 321 providing a gradient of material removal/deposition between the two surfaces (one fully obscured and one partially obscured) on either side of peak 321. FIG. 3D shows a ramped insulator 326, which may be used with a trigger electrode 110 which has a surface 330 flush with depressed region of insulator 101, or the trigger electrode 110 may extend to full height flush to the cathode 108 as shown with profile 328. Additionally, the trigger electrode profile may be flat, as shown, or tapered to a point (not shown), beveled to a flat surface 328 (not shown), or rounded (not shown). FIGS. 3E, 3F, and 3G show additional embodiments of insulator 101, with surfaces 318, 324, 328/330, respectively, which are obscured from redeposition of plasma ejected from the cathode by geometry with respect to returning plasma metal ions. Insulator 101 may have any shape which provides at least one surface obscured from redeposition, or in equilibrium for erosion from plasma trigger events, and re-deposition from returning metal ions after the trigger events. Insulator 101 may have other non-planar surface features such as rippled surface features which provide an equilibrium of metal deposition and removal from each plasma event, or a roughened surface which preserves microplasma formation in the microgaps on the metallization. The design constraint for the insulator may be stated thus: the thickness of new material deposited on each pulse over obscured surfaces such as 305 and 306 of FIG. 3A (or the obscured surfaces of the other exemplar insulators of FIGS. 3B-3G), in total, should be equal to the thickness that is eroded by each trigger flashover event. In one example of the invention, the depth of 306 relative to surface 304 and width of the groove forming surfaces 305 and 306 is selected to have an aspect ratio of 2 or more, and the equilibrium of deposition/erosion is applied to at least one of surface 305 or 306. The aspect ratio of the features is understood to be the depth of the feature parallel to the cathode central axis divided by the width of the feature parallel to the face of the cathode. When this balance is achieved, the insulator 101 acts as a reliable trigger with a repeatable surface resistance over millions of pulses. For example, in a 5 kg orbit raising example described later in this application, the total number of pulses for a 14 days mission at 2 Hz is $2.5 \times 10^6$. The total propellant mass burned in this period is approximately 30 g. A single Mo cathode in the MPT 30 mm in diameter would erode this mass over a depth of 4 mm. Insulator 301 is shown in detail FIG. 3A. Over successive plasma discharge events, metal ions from cathode 108 tend to accumulate on insulating interface 304. This accumulation may reduce the surface resistance for the trigger current. A groove 306 obscures proximal regions of the insulator from metal ion re-deposition. The depth of groove is selected such that the material which is removed by a plasma ignition event is equal to the re-deposition of new material from a main plasma arc event. In this manner, the re-deposition of material offsets the material lost, and the igniter remains usable over millions of ignition events. FIG. 4A shows a similar groove formed by surfaces 406 and 406 which are shielded from re-deposition of ions released from cathode 113, whereas surface 404 is expected to receive depositions more heavily than surfaces 406 or 407. The insulator configurations for an axial trigger electrode of FIG. 3 may be utilized in the circumferential trigger geometry of FIG. 4 by mirroring the insulator feature so that a surface profile which was near a central trigger electrode is maintained when the trigger electrode is circumferential. For example, the insulator profile of FIG. 3A (with stepped surface 306 adjacent to the trigger electrode 110) may be mirrored to transform to the insulator profile shown in FIG. 4A (which maintains the stepped surface 406 adjacent to the trigger electrode 109). Similarly, the insulator 101 features 414, 417, and 416 of circumferential trigger FIG. 4B may be transformed from the corresponding insulator 101 features 312, 314, and 316, respectively, of axial trigger FIG. 3B by mirroring the surface features. Accordingly, the other insulator profiles shown in the figure sequence 3C to 3G may be similarly transformed for circumferential trigger use, thereby maintaining at least one proximal surface which is obscured from re-deposition of plasma ions ejected from the cathode. The insulator 101/111 material need not be a high temperature ceramic, as the insulator surface is exposed to a small fraction of the trigger plasma briefly during part of T1, and T1 is a small fraction of the plasma duration T1+T2. A suitable insulator 101/111 is one which supports on the order of 1µ of surface metal deposition and has a melting temperature sufficient to withstand the energy imparted from the trigger arc over repeated cycles.

In one example of the invention, the MPT has a diameter in the range of 5 mm to 40 mm. In another example of the invention, with reference to FIG. 2, the MPTs are arranged over one or more surfaces of a cube of approximate dimension 10 cm×10 cm×10 cm, one or more surfaces of the cube having a plurality of MPTs, each MPT including an anode lead 106 which includes a capacitor C2 210 to the respective MPT trigger, and the cathode leads 104 commonly connected. For this configuration, a single power supply 201 may be used for a cube face to control a particular orthogonal thrust direction, each MPT (or a group of MPTs) on a particular surface connected via a switch element (reed relay or other low resistance switch), with one group of MPTs at a time connected, and the others isolated. In this manner, one or more MPTs may be selected until its useful lifetime of thrust pulses is exhausted, after which the MPT with associated capacitor 210 may be isolated, and a new MPT and associated capacitor 210 selected for continued operation.

FIG. 10 shows an example 3 axis thrust control cube, where five of the six external surfaces have thrusters attached to provide orthogonal thrust directions. In the example of FIG. 10, each surface of the thrust cube 1000 has four thrusters mounted in an orthogonal arrangement, with bottom thrusters 1006 providing +Z thrust, top thrusters 1002 providing −Z thrust, left side thrusters 1004 providing +X thrust, and right side thrusters 1010 providing −X thrust.

Front thrusters 1010 provide +Y thrust. In a typical configuration for a satellite thruster, each opposite surface of the satellite would have a thrust cube, which would have a surface configured to provide an opposing −Y thrust. In a typical satellite deployment, 2 to 8 or more such thrusters of FIG. 10 may be employed. Each surface may have an arbitrary number of thrusters, which may be activated individually or in groups to provide granularity of thrust events with orthogonal direction.

FIG. 11 shows a schematic diagram of an example three axis thruster for use with the thrust cube of FIG. 10. Power supply 1101 is operative as was described in FIG. 2, where a DC supply 1102 charges energy storage capacitor 1108 C1, as before. Capacitor C1 may be two 21 mF capacitors in parallel. As described for FIG. 2, trigger switch 1110 closes for a duration of time sufficient to maximize an instantaneous current in L1 1106, after which switch 1110 releases, allowing the current stored in inductor L1 1106 to be directed to one or more selected thrusters in thruster cube assembly 1118. Trigger switch 1110 may be formed using four IGBT devices, and storage inductor L1 1106 can be a 70 uH inductor, thereby providing 150 A rising roughly linearly in 320 us. Blocking capacitor 1130 can be a value such as 500 nF which couples the trigger voltage to a selected trigger electrode through a trigger switch such as insulated gate bipolar transistor (IGBT) 1126. The selection of individual thrusters is accomplished using thruster select inputs 1132, which are coupled to isolating drivers 1128, which may be optoisolators or other isolating switch elements which allow for low voltage control and isolation from the large magnitude transient voltages of the actuated thrusters of 1118. Each driver such as 1128 is coupled to a trigger switch 1126 which may be an IGBT 1126, which is either in an ON state or OFF state. For the case of an IGBT switch 1126 in the ON state, the instantaneous current is coupled through blocking capacitor 1130 and applied to the collector (drain) electrode of the trigger switches such as 1134, which in the ON state is coupled to the emitter (source) 1136, which couples the associated trigger current to the trigger electrode of thruster 1124, which initiates a triggering plasma from the cathode to the trigger electrode, which plasma initiates the main arc discharge from the cathode electrode of 1124 to anode electrode 1120, generating thrust as was previously described. Each driver of the trigger driver 1116 is configured so that each individual thruster 1138 through 1122 are individually selectable for a thrust generation event. As was previously described, the duration of the plasma provided by the circuit of FIG. 11 is primarily governed by the energy storage device 1106 and thruster electrode geometry, and may within the range of orders of magnitude greater than 6 us or orders of magnitude less than 6 us.

In an alternative embodiment of the invention as was previously described for providing continuous plasma thrust, a switchable DC source may be applied across the anode 1112 and cathode 1114 electrodes of FIG. 11, and selected thrusters initiated with a voltage pulse to the initiator electrode (replacing capacitor 1130) sufficient to initiate the plasma in selected thrusters, where the plasma is continuously operative until the switchable DC source is removed.

The individual thruster geometry used in the thruster cube 1118 is shown as the circumferential trigger geometry for thrusters 1138 through 1122 of FIG. 11, including any of the configurations shown in FIG. 1B, 4, 4A, or 4B. Example circumferential trigger thruster 1138 is shown with outer trigger electrode 1142, inner cathode electrode 1142, and insulator 1146. Thrusters 1138 through 1122 can alternatively be any of the axial geometries previously described for FIG. 1A, 3, 3A, 3B, 3C, 3D, 3E, 3F, or 3D.

Additionally, the thrusters 1138 to 1122 of thruster cube 1118 may be placed on a single surface or multiple surfaces of the cube of FIG. 10 with any number of thrusters on a particular surface. In certain configurations of a satellite, there may be an orbital direction vector, for which thrust which is not symmetric with respect to a line of action (or travel) may induce an angular moment to the satellite, causing undesirable rotation. To counter this, it may be preferable to place symmetric pairs of thrusters on a particular surface and to actuate the thrusters in pairs, one on either side of the line of action, to prevent a rotational moment in the delivered force. These are example configurations given for understanding of the invention and are not intended to limit the scope of the invention.

In one example of the invention, each of the thrusters on a surface of the thruster cube are configured to be connected to the anode 1112 and cathode 1114 conductors of the power supply 1101 and each thruster is individually selectable using thruster input 1132 which selects the particular thrusters to receive a trigger pulse to produce thrust, whereas the non-selected thrusters which do not receive the trigger pulse remain passive. In this manner, granularity of pulsed plasma from one or more orthogonal surfaces is possible. In one example of the invention, the pulsed power supply 1101 and trigger driver 1116 are packaged in an inner enclosure of FIG. 10 which has thrusters of 1118 on outer surfaces as shown in FIG. 10, thereby providing low loss coupling from inductor 1106 to selected thrusters of thruster cube 1118.

Many such configurations are possible, this particular example is given for illustration only.

Compared to the VAT device, the MPT differs from the prior art VAT in three distinct ways:
  (1) the MPT has plasma arc currents in the range of 200 A to 300 A or more vs. the VAT which has currents of 100 A, which reflect the characteristic of the underlying energy storage elements: inductors (with higher Ohmic loss) result in lower currents than capacitors (with lower Ohmic loss).
  (2) The MPT arc has a longer duration (~3 ms to 12 ms) compared to the arc duration in a VAT (~100 μs to 500 μs), due to the use of capacitors as storage elements.
  (3) The inductor in an MPT for initiating the plasma is on the order of 40 μH-80 μH vs. 1 mH for a VAT which stores the plasma energy in the inductor. The inductor in the MPT stores <2% of the energy delivered to the arc on each cycle.

The higher values of ISP offered by the MPT make it more fuel efficient than the PPT for missions in space. It is well known from the rocket equation that for a given mission in orbit, the amount of propellant that must be exhausted from the spacecraft at a given exit speed depends strongly (exponentially) upon this exit speed. The propellant mass $M_p$ is related to the initial spacecraft mass $M_o$ by:

$$M_p = M_o \left(1 - e^{\frac{\Delta V}{u_e}}\right) \quad (1)$$

where $\Delta V$ is the velocity change required for the orbital maneuver and $u_e$ is the exhaust speed of the propellant. Eq. 1 shows that for a given maneuver, the higher the exhaust speed, the lower the mass of propellant that is required.

For example, consider the example of raising a spacecraft from an orbit of 500 km above the earth to a higher orbit of 700 km. These orbits place the spacecraft well above the 411 km orbit of the International Space Station (ISS) and hence avoid cluttering that orbit and potentially posing a threat to manned missions. The equations of orbital mechanics may be used to calculate the change in velocity (defined as $\Delta V$) required to accomplish such an orbital maneuver, which is 110 m/s. Table 2 lists three different types of propulsion: (1) The Metal Plasma Thruster that is the subject of the present invention with Molybdenum as a candidate propellant; (2) a pulsed plasma thruster (PPT) sold by Busek corporation; (3) a FEEP Thruster sold by ACCION.

TABLE 2

RAISE A 5 kg nano-SAT FROM 500-700 KM ORBIT

|  | Mo MPT | Busek PPT | ACCION ESP |  |
| --- | --- | --- | --- | --- |
| speed | 17235 | 5258 | 17658 | m/s |
| $\Delta V$ | 110 | 110 | 110 | m/s |
| $M_o$ | 5 | 5 | 5 | kg |
| $M_p$ | 32 | 104 | 31 | g |

Assuming that each of these thrusters is used to raise a 5 kg spacecraft (such as a nano-satellite) from an orbit of 500 km to 700 km (this maneuver requires a $\Delta V$ of 110 m/s), the propellant mass $M_p$ required by each of these engines is calculated from Eq. 1 and given in the last row of the table. The Mo MPT and ACCION FEEP both require about 30 g to be burned, while the Teflon® (PTFE) PPT requires about 100 g. The advantage of higher ISP of the MPT and the FEEP is lower propellant mass required.

The thrust efficiency of any of the electric propulsion systems is determined primarily by the energy cost to create the ion from the solid (Teflon® PPT or MPT) or liquid (FEEP) state. The FEEP is the most efficient of all three systems since the field evaporation is a direct, non-thermal extraction by quantum tunneling across a potential barrier. The Teflon® PPT and the MPT both use a thermal process to ionize the atoms. In such a thermal process the ionization cost is much higher, approximately 100 eV per atom vs. approximately 10 eV per atom in the FEEP. As a result, thrust/power input ratio of the FEEP is higher than that of the Teflon® PPT or the MPT. But the mass of the MPT (for a given power) is much lower than that of the FEEP. Hence the thrust/mass ratio of the MPT and FEEP are comparable.

The examples shown in the present invention are intended for understanding the invention, which may be practiced many different ways. It is understood that the example values for the inductor, first capacitor, second capacitor, voltages and currents, trigger electrode to cathode electrode, insulator gap and insulator surface profile and shape are typical examples, rather than limitations of the invention, which is established by the claims which follow. Quantities which are referenced within an order of magnitude are understood to be a factor of 10, or more, larger or smaller than the referenced quantity. In an example variation, the trigger current is periodically measured and used to change the threshold voltage for starting the thrust cycle adaptively to higher or lower voltage levels. In this manner, the detection of additional metal deposition on the surface of the insulator (from an increased V/I peak at arc initiation) would result in a change in threshold voltage to increase the erosion rate, and the detection of increased metal erosion (from a decreased V/I peak at arc initiation) would result in a change in threshold voltage in the opposite direction. The direction of controller threshold adjustment to higher or lower voltages may be performed adaptively based on measurement, or based on an electrode wear, pulse discharge count, or other algorithm.

We claim:

1. A metal plasma thruster comprising:
   an enclosure having at least one surface;
   a plurality of plasma thrusters, at least one plasma thruster of the plurality of plasma thrusters coupled to said at least one surface;
   each plasma thruster of said plurality of plasma thrusters comprising:
      a respective cathode electrode having a respective cathode planar annular surface;
      a respective trigger electrode separated from the respective cathode electrode by a respective insulator, the respective trigger electrode and the respective cathode electrode having a respective common axis;
      each insulator having a respective insulator first planar annular surface which is substantially co-planar to the respective cathode planar annular surface each insulator having a respective insulator second surface formed by rotation of a sawtooth pattern about the respective common axis, each insulator first planar surface and each insulator second surface initiating a respective plasma between the respective trigger electrode and the respective cathode planar annular surface, each insulator second surface having regions which are obscured from re-deposition of ejected particles ejected from the respective cathode planar annular surface;
   where an angle of the sawtooth pattern is chosen to result in a deposition equilibrium between re-deposition of the ejected particles and vaporization of re-deposited particles over multiple plasma initiation events;
   the plurality of plasma thrusters having a common porous anode electrode positioned opposite each cathode planar annular surface of each plasma thruster of said plurality of plasma thrusters;
   an energy source comprising an inductor charged to a plasma current and having an anode conductor coupled to said common porous anode electrode and a cathode conductor coupled to each cathode electrode;
   a respective trigger electrode switch coupled between a blocking capacitor and each trigger electrode, said blocking capacitor having an opposite electrode coupled to said anode conductor;
   at least one trigger electrode switch enabled to couple said energy source via said blocking capacitor to the respective trigger electrode.

2. The metal plasma thruster of claim 1 wherein each cathode electrode contains a metal.

3. The metal plasma thruster of claim 2 where said metal is at least one of: Lithium (Li), Carbon (C), Magnesium (Mg), Aluminum (Al), Titanium (Ti), Chromium (Cr), Niobium (Nb), Molybdenum (Mo), Tantalum (Ta), Tungsten (W), Platinum (Pt), Palladium (Pd), Uranium (U), Radium (Ra), Barium (Ba), Strontium (Sr), Cerium (Ce), Europium (Eu), Ytterbium (Yb), Calcium (Ca), Lanthanum (La), Praseodymium (Pr), Silver (Ag), Neodymium (Nd), Actinium (Ac), Gold (Au), Samarium (Sm), Copper (Cu), Promethium (Pm), Manganese (Mn), Beryllium (Be), Gadolinium (Gd), Terbium (Tb), Dysprosium (Dy), Nickel (Ni), Holmium (Ho), Cobalt (Co), Erbium (Er), Yttrium (Y), Iron (Fe), Scandium (Sc), Thulium (Tm), Protactinium (Pa), Lutetium (Lu), Thorium (Th), Zirconium (Zr), Vanadium (V), Rhodium (Rh), Hafnium (Hf), Technetium (Tc), Ruthenium (Ru), Iridium (Ir), Osmium (Os), Rhenium (Re), Francium (Fr), Cesium (Cs), Gallium (Ga), Rubidium (Rb), Potassium (K), Sodium (Na), Indium (In), Tin (Sn), Polonium (Po), Bismuth (Bi), Thallium (Tl), Cadmium (Cd), Lead (Pb), and Zinc (Zn).

4. The metal plasma thruster of claim 1 where said common porous anode electrode is a ring or torus having a central aperture with a diameter greater than a diameter of said cathode electrode.

5. The metal plasma thruster of claim 1 where said common porous anode electrode is a screen.

6. The metal plasma thruster of claim 1 where said common porous anode electrode contains at least one of: stainless steel and a refractory metal.

7. The metal plasma thruster of claim 1 where each insulator is formed from at least one 20 of: a ceramic, alumina, and glass.

8. The metal plasma thruster of claim 1 where said respective insulator second surface of each insulator is obscured from re-deposition of the ejected particles by a respective obscuring surface which is either depressed with an aspect ratio greater than 2:1, or wherein each insulator second surface has a respective obscuring surface which is shadowed from re-deposition by a respective adjacent surface of the respective insulator which is exposed to re-deposition by the ejected particles.

9. The metal plasma thruster of claim 1 where each insulator has a respective metallized surface.

10. A metal plasma thruster comprising:
a plurality of thrusters;
at least one surface coupled to at least one thruster of said plurality of thrusters;
each thruster of said plurality of thrusters comprising:
   a respective central electrically conductive cathode electrode having a respective central electrically conductive cathode electrode face;
   a respective annular insulator surrounding the respective central electrically conductive cathode electrode;
   a respective outer electrically conductive trigger electrode surrounding each annular insulator and having a respective annular gap to the respective central electrically conductive cathode electrode face for a respective initiating plasma to form, the respective outer electrically conductive trigger electrode surface of each annular insulator, and each central electrically conductive cathode electrode providing a respective plasma formation surface;
   each annular insulator having a respective first surface which is coplanar to the respective central electrically conductive cathode electrode face, each annular insulator having a respective second surface which is obscured from redeposition of material ejected from the respective central electrically conductive cathode electrode face;
   each second surface being obscured from re-deposition by having at least one respective region which is angled with respect to the respective central electrically conductive cathode electrode face such that re-deposition and vaporization of metal from the respective second surface are in equilibrium over multiple plasma formation events;
   an electrically conductive porous anode positioned opposite at least one central electrically conductive cathode electrode face and coupled to an anode conductor;
   an inductor charged with a current through a charging switch, a release of the charging switch coupling said current through said anode conductor to a cathode conductor coupled to the respective central electrically conductive cathode electrode of each thruster of said plurality of thrusters;
   a blocking capacitor coupled to said anode conductor, said blocking capacitor coupled to a plurality of trigger switches, each electrically conductive trigger electrode coupled to a respective trigger switch among the plurality of trigger switches;
   whereby at least one trigger switch of the plurality of trigger switches is ON when said charging switch is released.

11. The metal plasma thruster of claim 10 where said electrically conductive porous anode or each central electrically conductive cathode electrode is at least one of: Lithium (Li), Carbon (C), Magnesium (Mg), Aluminum (Al), Titanium (Ti), Chromium (Cr), Niobium (Nb), Molybdenum (Mo), Tantalum (Ta), Tungsten (W), Platinum (Pt), Palladium (Pd), and Uranium (U).

12. The metal plasma thruster of claim 10 where said electrically conductive porous anode is a ring or torus having a central aperture with an aperture diameter greater than a cathode electrode diameter of each central electrically conductive cathode electrode.

13. The metal plasma thruster of claim 10 where said electrically conductive porous anode is a screen.

14. The metal plasma thruster of claim 10 where each annular insulator has a metallized surface which has microgaps.

15. The metal plasma thruster of claim 10 where each annular insulator has a metallized surface with a resistance in a range of one to one hundred ohms or a resistance in the range of one hundred to ten thousand ohms.

16. A metal plasma thruster comprising:
a surface;
a plurality of thrusters, at least one thruster of said plurality of thrusters coupled to said surface, each thruster of said plurality of thrusters comprising:
   a respective central trigger electrode having a respective central trigger electrode face;
   a respective insulator surrounding each central trigger electrode;
   a respective cathode electrode surrounding each insulator each cathode electrode having a respective cathode electrode face;
   each insulator having a respective first surface which is coplanar to the respective cathode electrode face, each insulator having a respective second surface which is obscured from re-deposition of material ejected from the respective cathode electrode face;
   each insulator second surface having a plurality of respective outer surfaces which meet at obtuse angles, the obtuse angles of each plurality of outer surfaces providing a respective equilibrium between re-deposited metal and vaporized metal over a series of plasma formation events;
an anode electrode positioned opposite the respective cathode electrode face of each said thruster of said plurality of thrusters;
an inductor for storing energy, a first terminal of said inductor coupled to said anode electrode and a second terminal of said inductor coupled through an energy storage capacitor to said cathode respective electrode of each thruster of said plurality of thrusters;

a selective trigger for coupling said energy from said anode electrode to at least one central trigger electrode of said plurality of thrusters.

17. The metal plasma thruster of claim 16 where said metal is at least one of: Lithium (Li), Carbon (C), Magnesium (Mg), Aluminum (Al), Titanium (Ti), Chromium (Cr), Niobium (Nb), Molybdenum (Mo), Tantalum (Ta), Tungsten (W), Platinum (Pt), Palladium (Pd), or Uranium (U).

18. The metal plasma thruster of claim 16 where said anode electrode is a torus having a central aperture with an aperture diameter greater than a cathode electrode diameter of said cathode electrode.

19. The metal plasma thruster of claim 16 where said anode electrode is a screen.

20. The metal plasma thruster of 5 claim 16 where each cathode electrode is formed from an alloy or element including at least one of: Magnesium (Mg), Aluminum (Al), Radium (Ra), Barium (Ba), Strontium (Sr), Cerium (Ce), Europium (Eu), Ytterbium (Yb), Calcium (Ca), Lanthanum (La), Praseodymium (Pr), Silver (Ag), Neodymium 10 (Nd), Actinium (Ac), Gold (Au), Samarium (Sm), Copper (Cu), Promethium (Pm), Uranium (U), Manganese (Mn), Beryllium (Be), Gadolinium (Gd), Terbium (Tb), Dysprosium (Dy), Nickel (Ni), Holmium (Ho), Cobalt (Co), Erbium (Er), Yttrium (Y), Iron (Fe), Scandium (Sc), Thulium (Tm), Palladium (Pd), Protactinium (Pa), Lutetium (Lu), Titanium (Ti), Thorium (Th), Platinum (Pt), Zirconium (Zr), Chromium (Cr), Vanadium (V), Rhodium (Rh), Hafnium (Hf), Technetium (Tc), Ruthenium (Ru), Iridium (Ir), Niobium (Nb), Molybdenum (Mo), Tantalum (Ta), Osmium (Os), Rhenium (Re), 20 Tungsten (W), Carbon (C), Francium (Fr), Cesium (Cs), Gallium (Ga), Rubidium (Rb), Potassium (K), Sodium (Na), Indium (In), Lithium (Li), Tin (Sn), Polonium (Po), Bismuth (Bi), Thallium (Tl), Cadmium (Cd), Lead (Pb), and Zinc (Zn).

21. A plasma thruster comprising:
a cathode electrode having a cathode electrode planar annular surface;
a trigger electrode separated from the cathode electrode by an insulator, the trigger electrode and cathode electrode having a common central axis;
the insulator having a first planar annular surface which is co-planar to the cathode electrode planar annular surface, the insulator having a second surface adjacent to the first planar annular surface, the second surface formed by rotation of a sawtooth about the common central axis, the insulator exposed to a plasma initiated between the trigger electrode and the cathode electrode planar annular surface, wherein portions of the second surface are obscured from re-deposition of ejected particles from the cathode electrode planar annular surface;
where an angle of the sawtooth is chosen to result in a deposition equilibrium between re-deposition of ejected particles and vaporization of re-deposited particles over multiple plasma formation events;
the plasma thruster having a porous anode electrode positioned opposite the cathode electrode planar annular surface.

* * * * *